(12) United States Patent
Heinzl et al.

(10) Patent No.: US 8,888,078 B2
(45) Date of Patent: Nov. 18, 2014

(54) MODULAR FLOW SYSTEM

(75) Inventors: Wolfgang Heinzl, Ramerberg (DE); Juergen Krelle, München (DE)

(73) Assignee: Wolfgang Heinzl, Ramerberg (DE)

( * ) Notice: Subject to any disclaimer, the term of this patent is extended or adjusted under 35 U.S.C. 154(b) by 593 days.

(21) Appl. No.: 13/266,661

(22) PCT Filed: May 3, 2010

(86) PCT No.: PCT/EP2010/002689
§ 371 (c)(1),
(2), (4) Date: Oct. 27, 2011

(87) PCT Pub. No.: WO2010/127818
PCT Pub. Date: Nov. 11, 2010

(65) Prior Publication Data
US 2012/0038069 A1      Feb. 16, 2012

(30) Foreign Application Priority Data

May 6, 2009  (DE) .......................... 10 2009 020 128

(51) Int. Cl.
| | | |
|---|---|---|
| *B01F 3/04* | (2006.01) | |
| *B01D 61/36* | (2006.01) | |
| *B01D 63/08* | (2006.01) | |
| *B01D 65/00* | (2006.01) | |

(52) U.S. Cl.
CPC .......... *B01D 61/364* (2013.01); *B01D 2313/04* (2013.01); *B01D 63/082* (2013.01); *B01D 61/362* (2013.01); *B01D 65/003* (2013.01)
USPC ......................................... 261/152; 261/108

(58) Field of Classification Search
CPC .. B01D 61/362; B01D 61/364; B01D 63/082; B01D 65/003; B01D 2313/04
USPC .......................................... 261/108, 113, 152
See application file for complete search history.

(56) References Cited

U.S. PATENT DOCUMENTS

| | | |
|---|---|---|
| 3,477,917 A | 11/1969 | Rodgers |
| 4,846,256 A | 7/1989 | Tasnadi nee Erosi |

(Continued)

FOREIGN PATENT DOCUMENTS

| | | |
|---|---|---|
| CN | 1547503 A | 11/2004 |
| DE | 38 16 434 A1 | 11/1988 |

(Continued)

OTHER PUBLICATIONS

English Abstract for SU 1 286 097 A3, Jan. 1987.

(Continued)

*Primary Examiner* — Charles Bushey
(74) *Attorney, Agent, or Firm* — Jacobson Holman Hershkovitz PLLC; Abraham Hershkovitz; Eugene Rzucidlo

(57) ABSTRACT

The invention relates to a modular flow system comprising a plurality of frame elements which can be combined by means of welded web structures to various stacks comprising in each case at least two, in particular at least ten frame elements, in order to form different functional units such as in particular a membrane distillation stage, a steam generator, a condenser, a heat exchanger, a filter and/or a pervaporation stage. The frame elements according to the invention comprise in each case an outer frame provided with passage openings and vapor and/or fluid channels as well as a central inner region surrounded by the outer frame. Moreover, each frame element is provided on both sides with a welded web structure that delimits, on the one hand, the region comprising the passage openings and the central inner region and, on the other hand, at least two regions, each comprising a vapor and/or fluid channel.

35 Claims, 14 Drawing Sheets

(56) References Cited

U.S. PATENT DOCUMENTS

Figure 1:
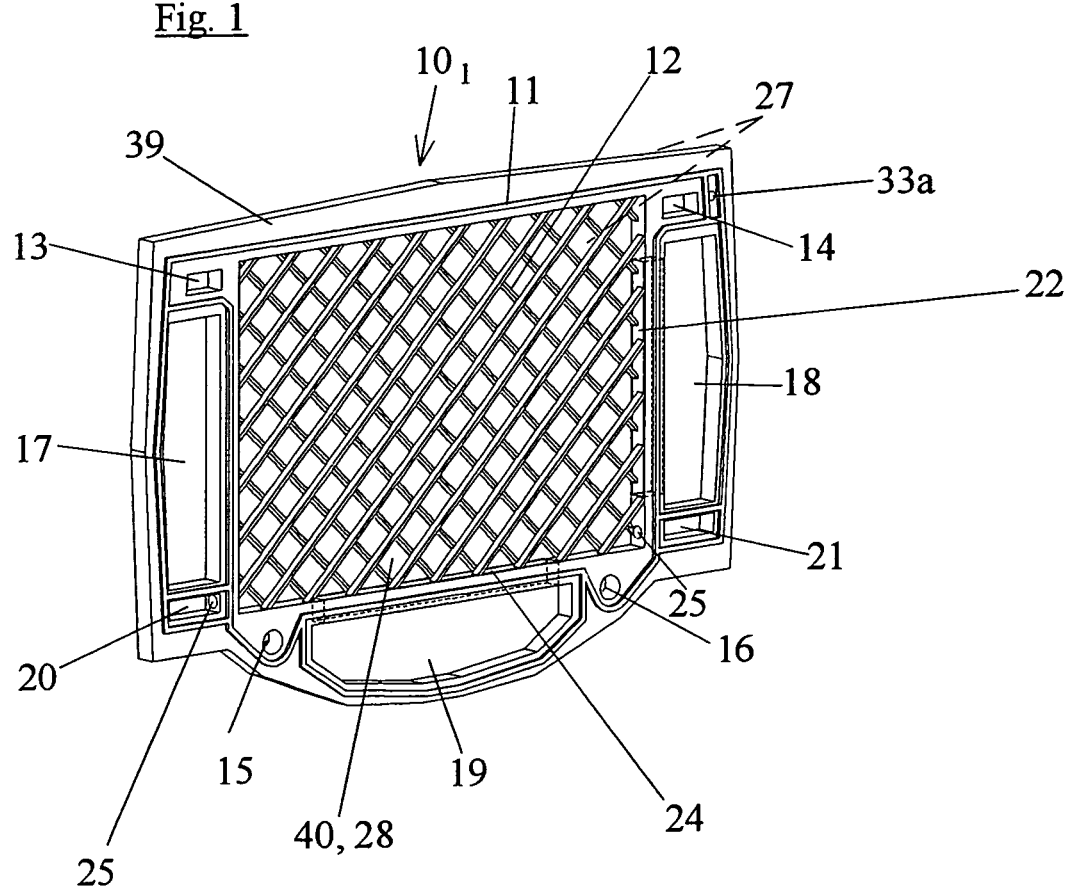

| | | | |
|---|---|---|---|
| 4,936,954 A * | 6/1990 | Sander | 202/172 |
| 5,829,517 A | 11/1998 | Schmid | |
| 6,681,846 B2 * | 1/2004 | Angermann et al. | 165/167 |
| 7,473,404 B2 * | 1/2009 | Chopard et al. | 422/605 |
| 8,293,114 B2 * | 10/2012 | Jonsson et al. | 210/650 |
| 2007/0241048 A1 | 10/2007 | Hunt | |

FOREIGN PATENT DOCUMENTS

| | | |
|---|---|---|
| DE | 196 17 396 A1 | 11/1997 |
| DE | 10 2009 020 128 A1 | 11/2010 |
| EP | 1 844 846 A2 | 10/2007 |
| EP | 1 925 355 A1 | 5/2008 |
| RU | 2 036 704 C1 | 6/1995 |
| SU | 1 286 097 A3 | 1/1987 |
| WO | WO 2005/089914 A1 | 9/2005 |
| WO | WO 2007/054311 | 5/2007 |

OTHER PUBLICATIONS

English Abstract for RU 2 036 704 C1, Jun. 1995.
Schneider K, et al., "Membrandestillation," Chemie Ingenieur Technik, vol. 56, No. 7, Jan. 1, 1984, p. 514-521, Wiley Vch. Verlag, Weinheim; DE.
International Search Report in corresponding PCT Patent Application No. PCT/EP2010/002689 dated Aug. 31, 2010.
English language translation of International Search Report in corresponding PCT Patent Application No. PCT/EP2010/002689 dated Aug. 31, 2010.
English Abstract for CN 1547503 A, Nov. 2004.

* cited by examiner

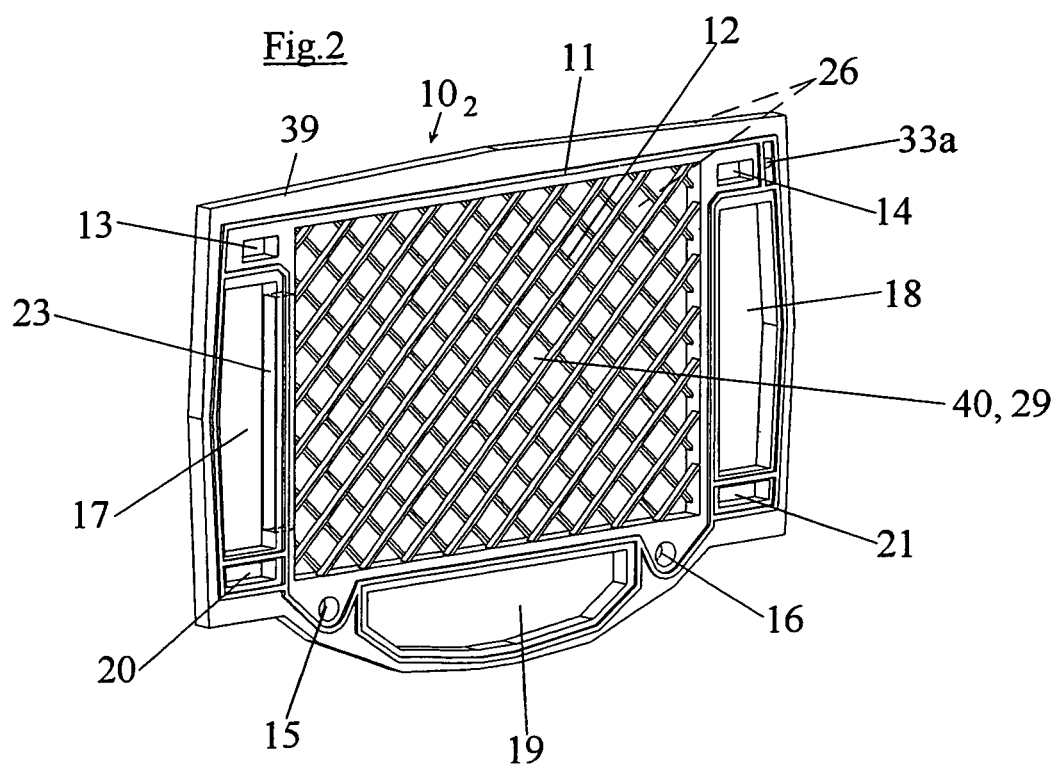

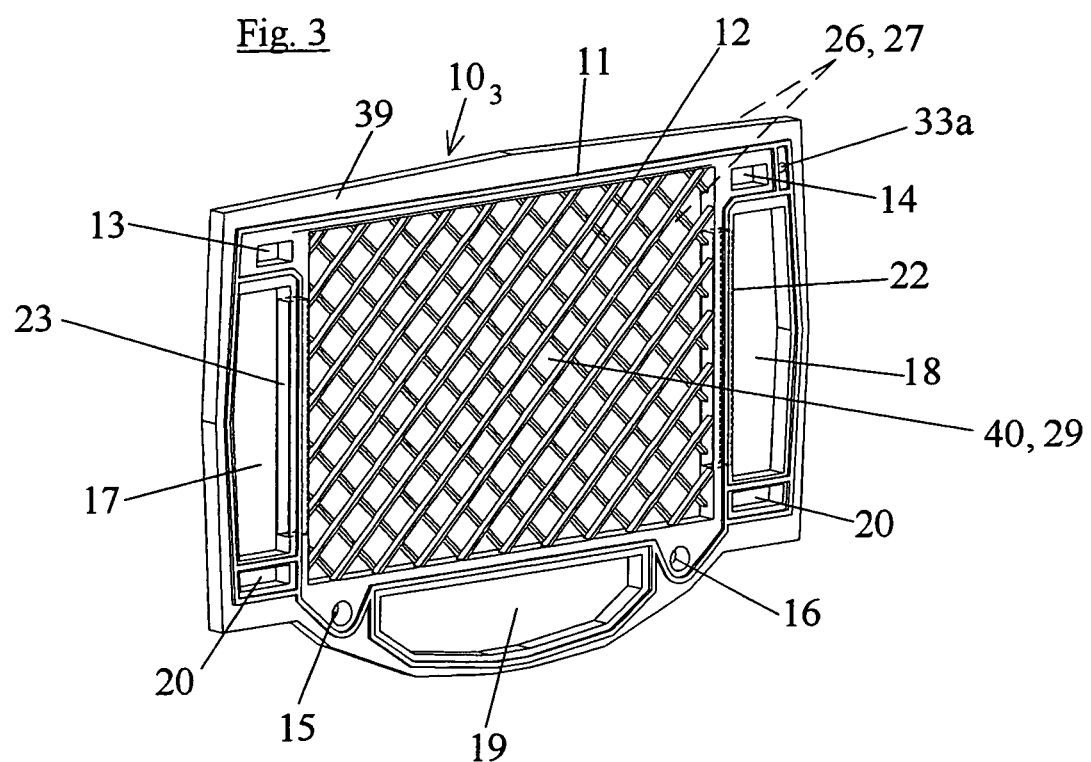

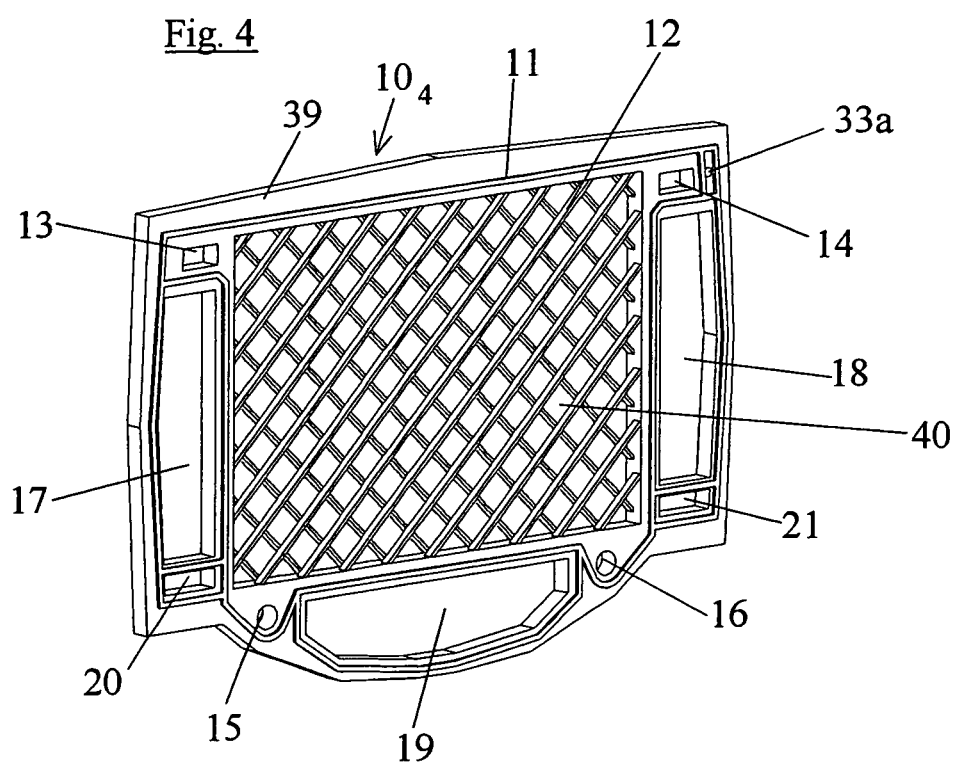

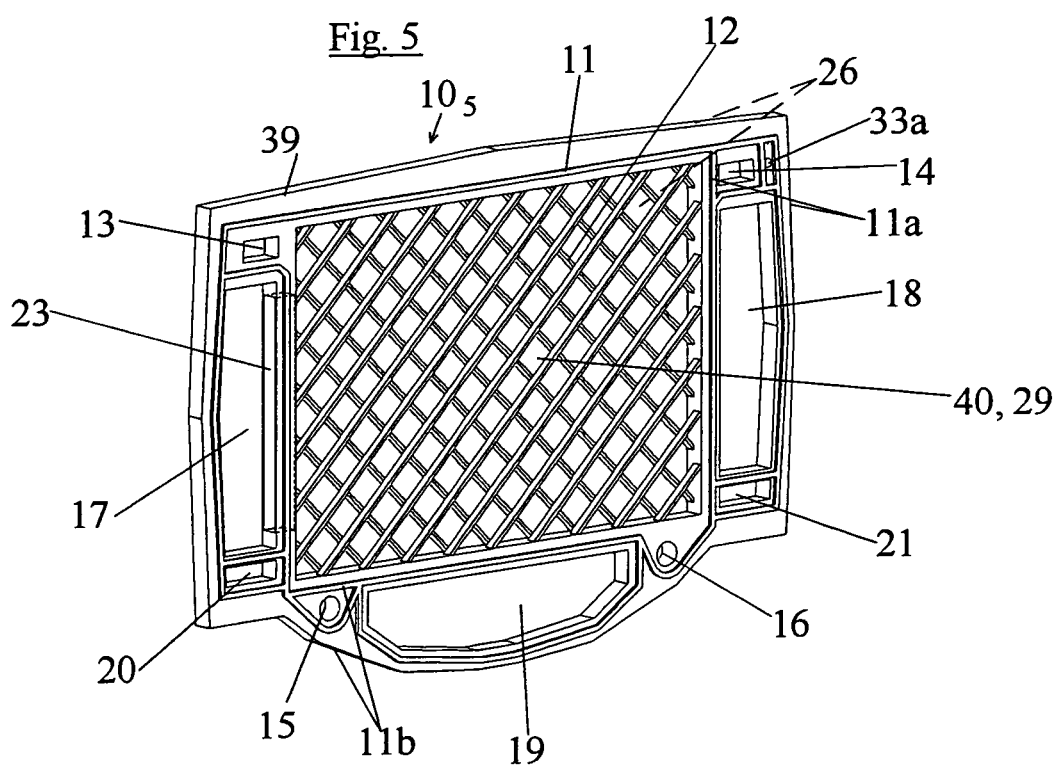

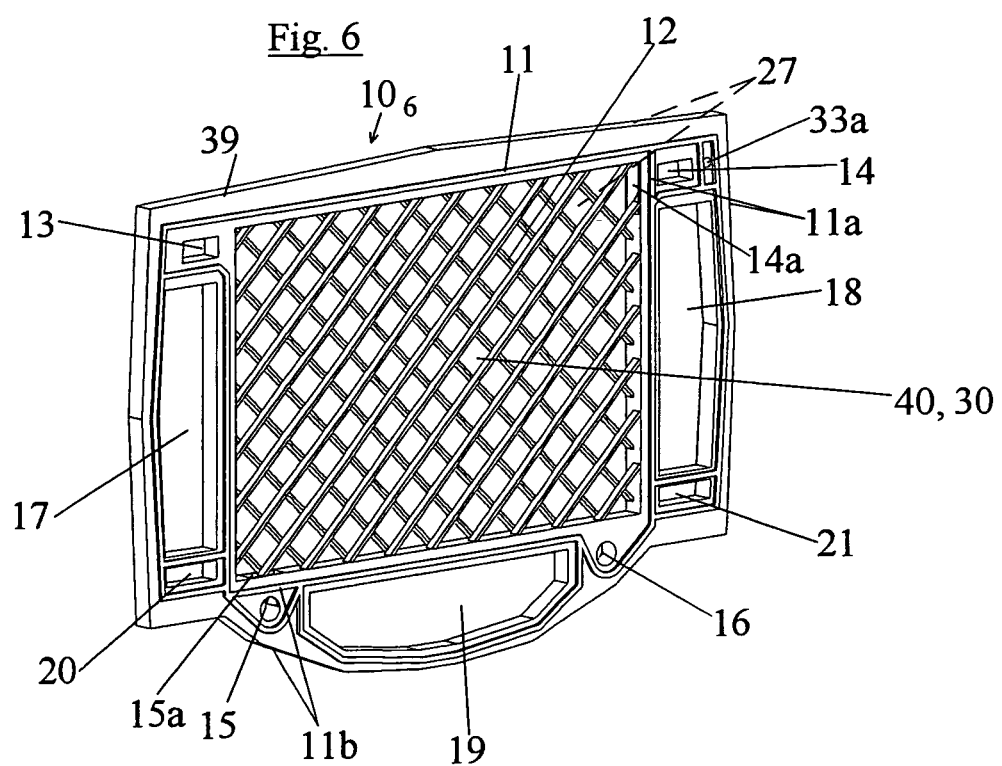

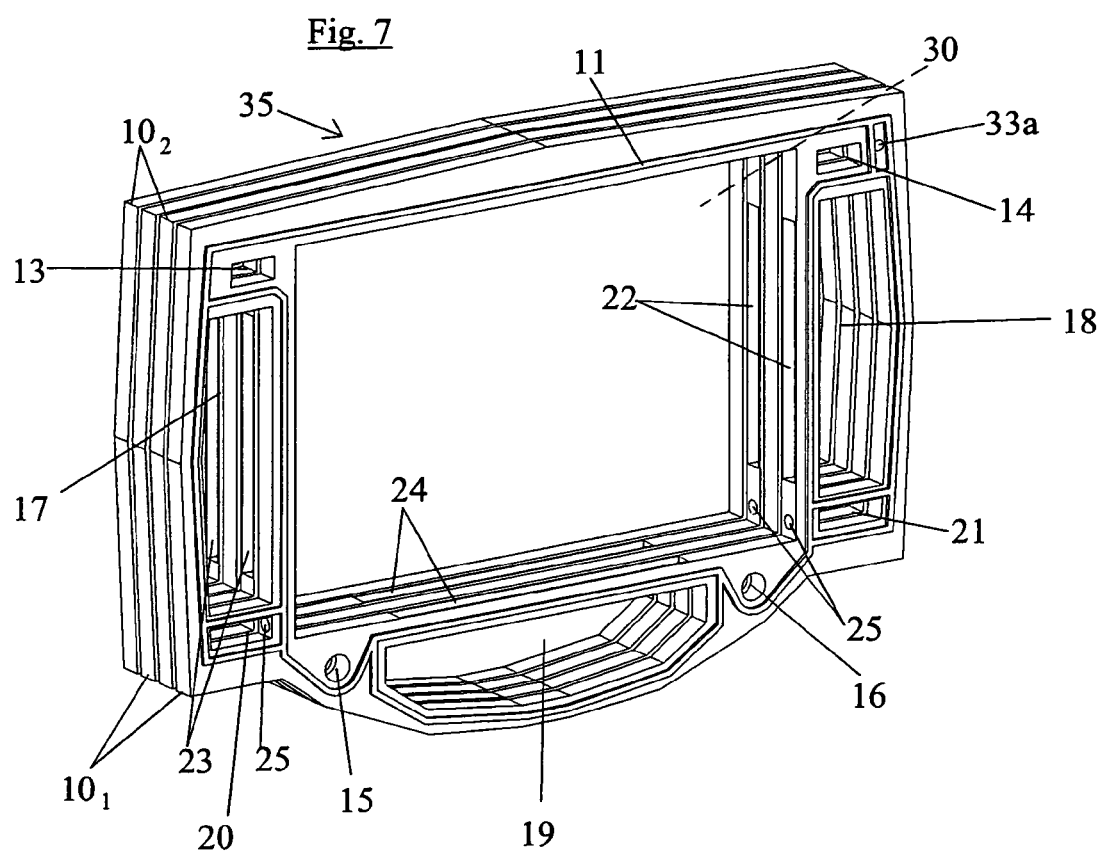

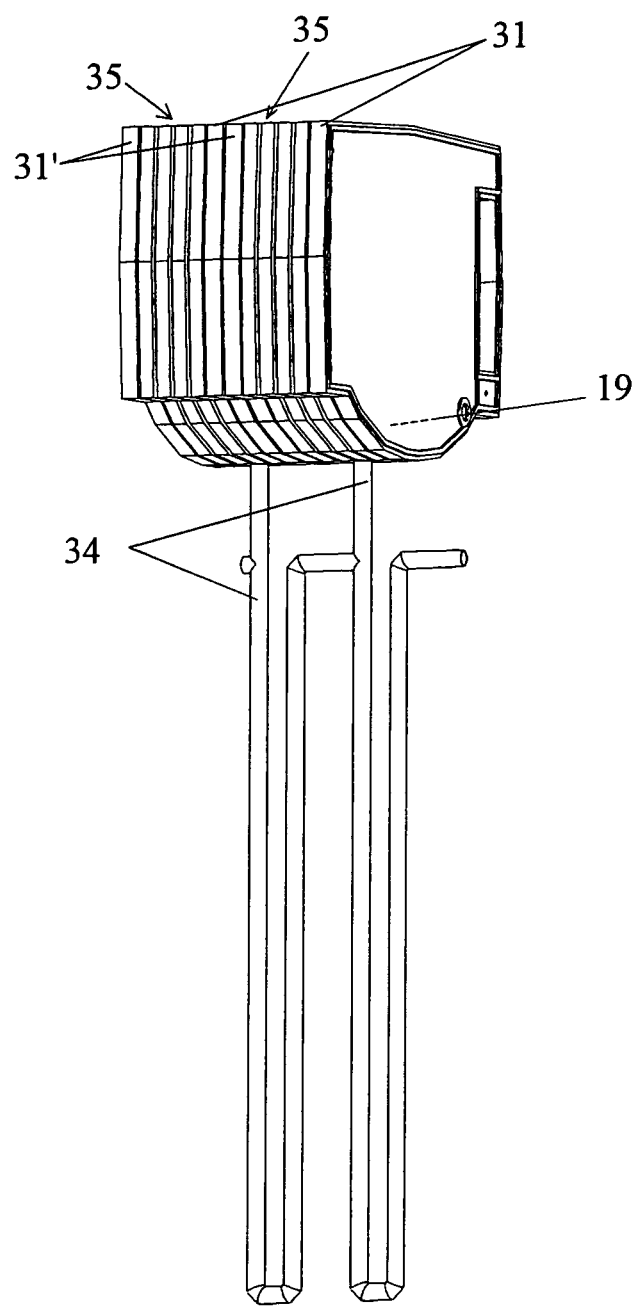

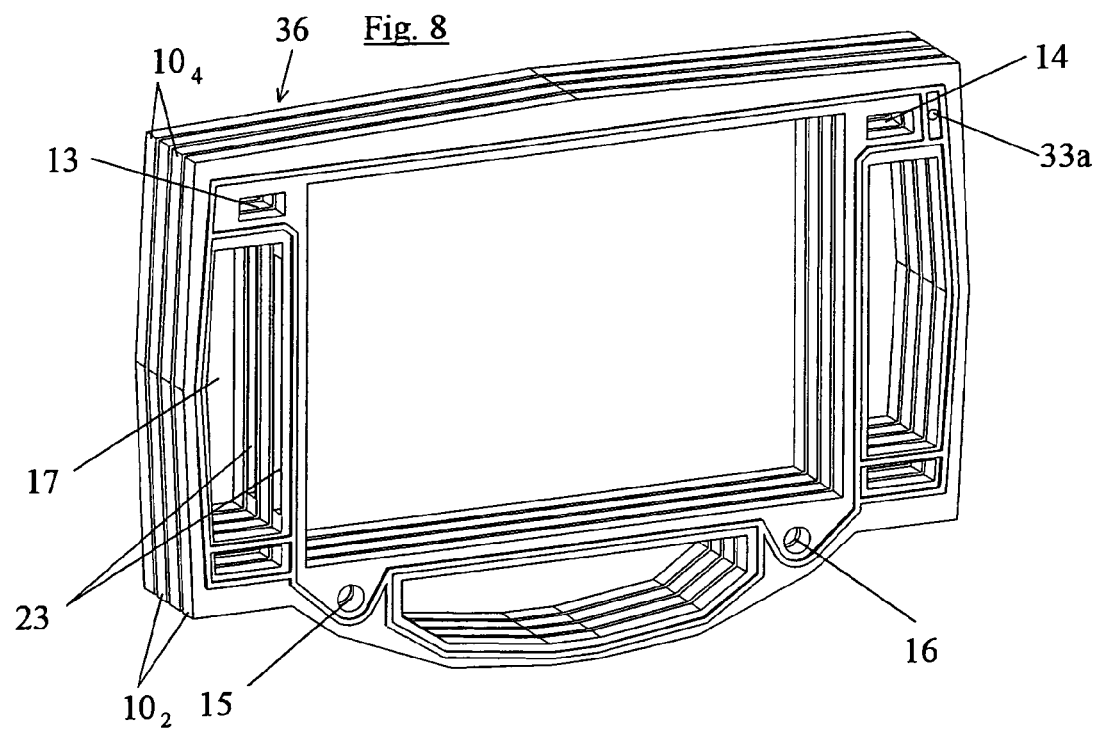

MODULAR FLOW SYSTEM

The invention relates to a modular flow system having a plurality of frame elements.

A flow module including a plurality of plate elements is already known from DE 196 17 396 A in which the different plate element are joined to one another via seals and the stack obtained then has to be screwed together to provide the required sealing pressure. In this respect, not only the screwing together of the stack, but also the putting together of the plate elements to form a stack is relatively complex.

It is the underlying object of the invention to provide an improved modular flow system of the initially named kind in which the named problems have been eliminated. In this respect, the flow system should be able to be used in as versatile a manner as possible in a simple and reliable manner, i.e. in particular to form as large a number of different functional units as possible.

In accordance with the invention, this object is satisfied by a modular flow system having a plurality of frame elements which can be combined together via welding web structures to form different stacks each including at least two frame elements, in particular at least ten frame elements, for forming different functional units such as in particular a membrane distillation stage, a vapor generator, a condenser, a heat exchanger, a filter and/or a pervaporation stage, wherein the frame elements each include an outer frame provided with passage openings and vapor and/or fluid passages and a central inner region enclosed by the outer frame and are each provided on both sides with a welding web structure which, on the one hand, defines a region including the passage openings and the central inner region and, on the other hand, defines at least two respective regions including a vapor and/or fluid passage.

The membrane distillation stage can in particular be a stage of a multi-effect membrane distillation process or apparatus such as are described in WO 2007/054311 which is herewith included in the disclosure content of the present application.

The central inner region of a respective frame element is preferably provided with a spacer, in particular a grid-like spacer.

In this respect, optionally a respective film or membrane can be arranged, in particular welded, on the two sides of the spacer, in particular of the grid-like spacer, with the films or membranes in particular being able to be welded onto the outer frame.

A respective film or membrane advantageously covers the total spacer, in particular the total grid-like spacer, with the passage openings being kept open, however.

At least one respective vapor and/or fluid passage is expediently provided at mutually oppositely disposed sides of a respective frame element. In this respect, the flow system is preferably designed so that the vapor and/or fluid passages, provided at the respective side, of the frame elements combined together to form a respective stack are aligned with one another.

Different functional units such as multi-effect membrane distillation stages, vapor generators, condensers, heat-exchangers, chemical reactors, filter cassettes, pervaporation stages and/or the like can be formed reliably and inexpensively using the modular flow system in accordance with the invention by different assembly of the frame elements, in particular with films and/or membranes as separating elements by welding the frame elements together. In this respect, all required variants can be produced using a production process in which optionally a film and a membrane are welded together so that in particular films or membrane functional units of the most varied embodiments such as energy and substance carriers or energy and substance exchangers, etc. can be manufactured reliably and inexpensively by welding together a plurality of frame elements depending on the separating structures used. A respective frame element can be prepared and welded together with different breakthroughs depending on the purpose of use so that a plurality of flow passages are created in a respective welded stack which can be separated from one another depending on the design, in particular by films and/or membranes.

The individual frame elements can be connected to one another via the welding web structures, with a friction welding process, a laser welding process and/or a heating element welding process being able to be used, for example.

The modular flow system advantageously includes at least one frame element of a first kind which includes a respective vapor and/or fluid passage on a first side and on a second side disposed opposite it, a vapor and/or fluid passage opening connecting the vapor and/or fluid passage on the second side to the central inner region and in particular a condensate passage opening at the lower side via which the central inner region is connected to a condensate collection passage bounded by the welding structure and in which a respective film is arranged within the welding web structure at both sides of the spacer, in particular the grid-like spacer in particular for forming a condensation space. In this respect, the outer frame preferably includes a respective inert gas passage defined by the welding web structure on mutually opposite sides, with at least one inert gas passage, preferably both inert gas passages, respectively being connected to the central inner region and/or of the condensation space via an inert gas passage opening and preferably an underpressure passage opening defined by the welding web structure.

It is additionally of advantage if the modular flow system includes at least one frame element of a second kind which includes a respective vapor and/or fluid passage on a first side and a second side disposed opposite it and a vapor and/or fluid passage opening connecting the vapor and/or fluid passage on the first side to the central inner region and in which a respective water-tight, vapor-permeable membrane is arranged within the welding web structure at both sides of the structure, in particular the grid-like structure, in particular for forming a vapor or fluid space so that the passage openings remain free. The outer frame in this respect preferably includes a respective inert gas passage defined by the welding web structure on mutually opposite sides, with these inert gas passages each being separated from the central inner region, and preferably an underpressure passage opening defined by the welding web structure.

Expediently, the modular flow system can also include at least one frame element of a third kind which includes a respective vapor and/or fluid passage on a first side and on a second side disposed opposite it, a vapor and/or fluid passage opening connecting the vapor and/or fluid passage on the first side to the central inner region and a vapor and/or fluid passage opening connecting the vapor and/or fluid passage on the second side to the central inner region and wherein a respective membrane or film is arranged within the welding web structure at both sides of the structure, in particular the grid-like structure in particular for forming a vapor or fluid space so that the passage openings remain free. The outer frame in this respect preferably includes a respective inert gas passage defined by the welding web structure on mutually opposite sides, with these inert gas passages each being separated from the central inner region, and preferably an underpressure passage opening defined by the welding web structure.

In accordance with a further preferred embodiment, the modular flow system includes at least one frame element of a fourth kind which includes a respective vapor and/or fluid passage at a first side and at a second side disposed opposite it, with the spacer, in particular the grid-like spacer, not being provided with either a film or with a membrane. The outer frame in this respect preferably includes a respective further passage, in particular an inert gas passage, defined by the welding web structure on mutually opposite sides, with these further passages and/or inert gas passages each being separated from the central inner region, and preferably an underpressure passage opening defined by the welding web structure.

It is in particular also of advantage if the modular flow system includes at least one frame element of a fifth kind which includes a respective vapor and/or fluid passage on a first side and on a second site disposed opposite it and a vapor and/or fluid passage opening connecting the vapor and/or fluid passage on the first side to the central inner region and in which a respective water-tight, vapor-permeable membrane is arranged within the welding web structure at both sides of the spacer, in particular the grid-like spacer, in particular for forming a vapor or fluid space so that the passage openings remain free, with the outer frame preferably in particular including an underpressure passage opening defined by the welding web structure and a respective inert gas passage defined by the welding web structure on mutually oppositely disposed sides and with these inert gas passages each being separated from the central inner region, and with the passage openings including at least two passage openings and at least two further passage openings and the welding web structure being provided with additional welding web part pieces to define the first passage openings with respect to the further passage openings.

This frame element of a fifth kind has a similar structure to the frame element of a second kind, with additional welding web part pieces being inserted, however, to separate the first passage openings from the second passage openings. In particular two separate fluid circuits can thus be realized. One fluid circuit can thus, for example, be operated via the first passage openings and a further fluid circuit via the further passage openings.

The modular flow system can also advantageously include at least one frame element of a sixth kind which includes a respective vapor and/or fluid passage on a first side and on a second side disposed opposite it, with a respective film being arranged within the welding web structure at both sides of the spacer, in particular the grid-like spacer, so that the passage openings remain free, with the outer frame preferably in particular including an underpressure passage opening defined by the welding web structure and a respective further passage, in particular inert gas passage, defined by the welding web structure on mutually oppositely disposed sides and with these further passages and/or inert gas passages each being separated from the central inner region, and with the passage openings including at least two first passage openings and at least two further passage openings, the welding web structure being provided with additional welding web structures to define the first passage openings with respect to the further passage openings and with the outer frame being provided with passage opening breakthroughs via which the vapor or fluid space bounded by the films is connected to the first passage openings.

Such a frame element of a sixth kind can be used, for example, for realizing a perforation stage or perforation module. It has a similar structure to the frame element of the fourth kind, with a respective film being provided on both sides, however, and additional welding web part pieces and passage opening breakthroughs being provided.

A respective stack including a plurality of frame elements combined together by welding is preferably connected, in particular welded at its two ends, in each case to a cover plate having connection openings.

In this respect, at least one of the two cover places is advantageously provided with an underpressure connection.

The underpressure passage opening of a respective frame element defined by the welding web structure can be aligned with the underpressure connection in the cover plates.

At least one of the two cover plates is preferably provided with an underpressure seal surrounding the connection openings and arranged at the cover margin.

Since two cover plates associated with mutually following stacks are oppositely disposed, of which at least on has underpressure seals, mutually following stacks can be connected together with a small effort in that the cover plates are pressed lightly toward one another and the intermediate space is subjected to underpressure via the underpressure connection, whereby the cover plates are pressed toward one another. The applied underpressure is communicated to the following stacks through the underpressure passage opening and presses them toward one another likewise. The corresponding connections of the two stacks are sealingly connected to one another by the underpressure seals surrounding the connection openings. The different functional units, e.g. a vapor generator, a plurality of membrane distillation stages, for example three, and a condenser of a multi-effect membrane distillation apparatus can be joined together without a great effort via different embodiments of the passage openings. A multi-effect stage combines condensation and vaporization in one stage. The condensation and vaporization take place at two different pressure levels.

A preferred embodiment of the modular flow system in accordance with the invention is characterized in that a stack is provided which includes at least two frame elements, in particular at least ten frame elements, for forming a membrane distillation stage and in which frame elements of a first and second kind are alternately included; in that a stack is provided which includes at least two frame elements, preferably at least ten frame elements, for forming a vapor generator and in which frame elements of a second and fourth kind are alternately included; in that a stack is provided which includes at least two frame elements, in particular at least ten frame elements, for forming a condenser and in which frame elements of a first and fourth kind are alternately included; in that a stack is provided which includes at least two frame elements, in particular at least ten frame elements, for forming a heat exchanger and in which frame elements of a third and fourth kind are alternately included; in that a stack is provided which includes a plurality of frame elements for forming a filter and in which frame elements of a third and fourth kind are alternately provided which are each provided with filter membranes at both sides; and/(or in that a stack is provided which includes a plurality of frame element for forming a pervaporation stage and in which frame elements, in particular frame elements of a fifth and sixth kind are included alternately which are provided at both sides with pervaporation membranes and at both sides with films.

In that a frame element of the fifth kind provided with a membrane and a frame element of the sixth kind provided at both sides with a film are welded alternately together to form a stack and the ends are welded to the named cover plates, perforation stages or perforation modules or vapor generators with an integrated heating circle can be realized, for example. In this respect, a space which is connected to the further passage openings and which is bounded on the one side by a film and on the other side by a membrane results between two respective frame elements due to the residual height of the welding structure removed on welding, including the additional welding web part pieces. It is in particular also of advantage in this respect if a spacer, for example a mesh-like spacer, is inserted between the film and the membrane and defines the spacing between the film and the membrane. Such a spacer is generally also expedient in all other stages or modules in this space.

The passage opening breakthroughs connect the vapor or fluid spaces of the frame elements of the sixth kind bounded by the films to the first passage openings. The vapor or fluid space of the frames of the fifth kind bounded by the membrane is connected to the vapor and/or fluid passage via the respective vapor and/or fluid passage opening.

The frame parts having no condensation passage openings are preferably also each provided with a condensation collection passage bounded by the welding web structure, with the condensate collection passages of the different frame parts being able to be mutually aligned in a respective stack.

Figure 9:
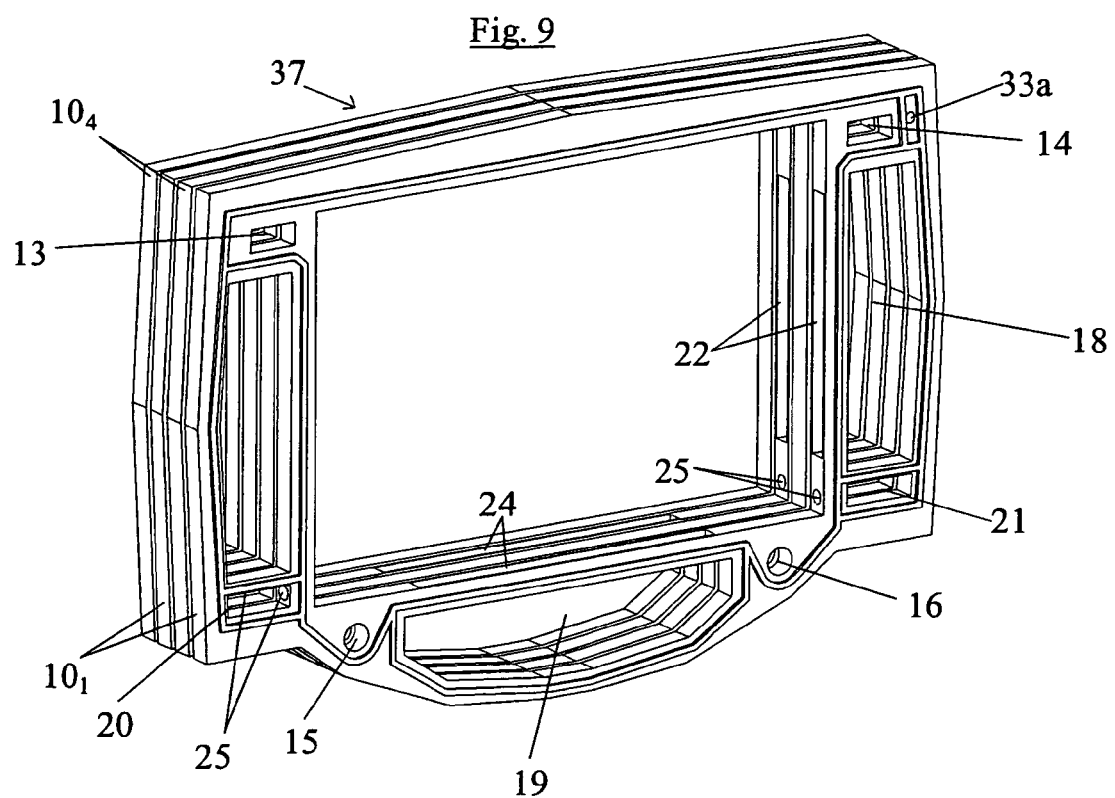
Figure 10:
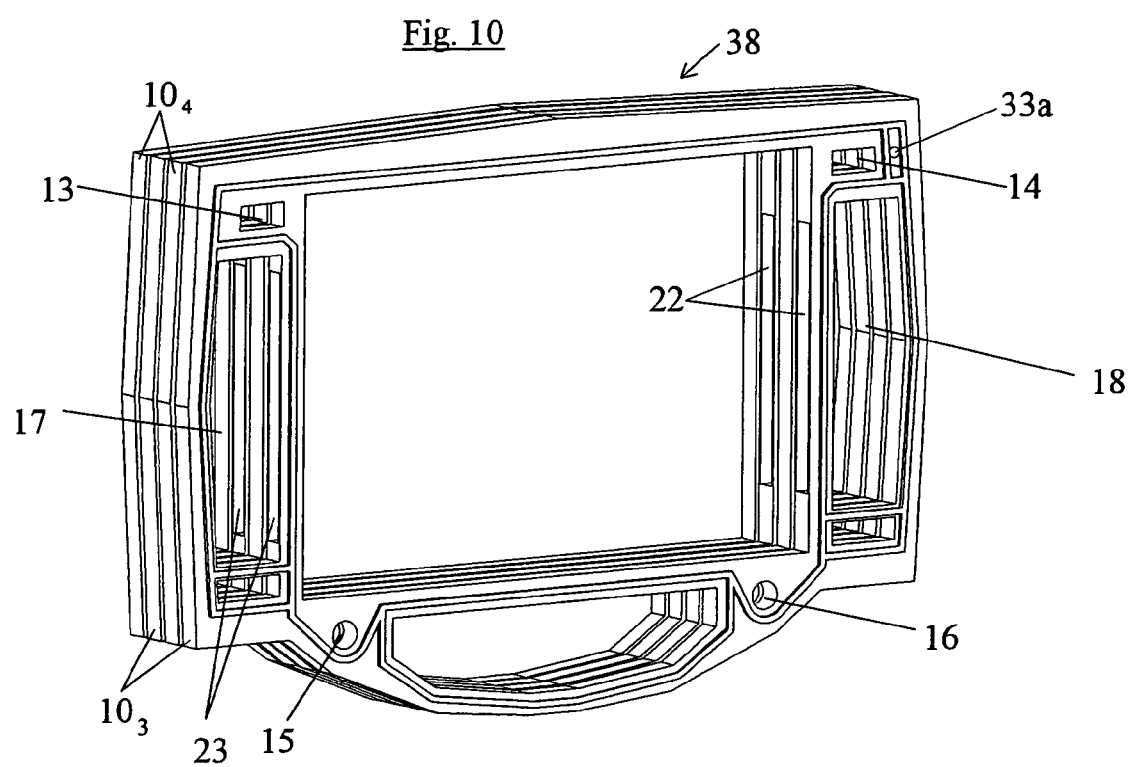
Figure 11:
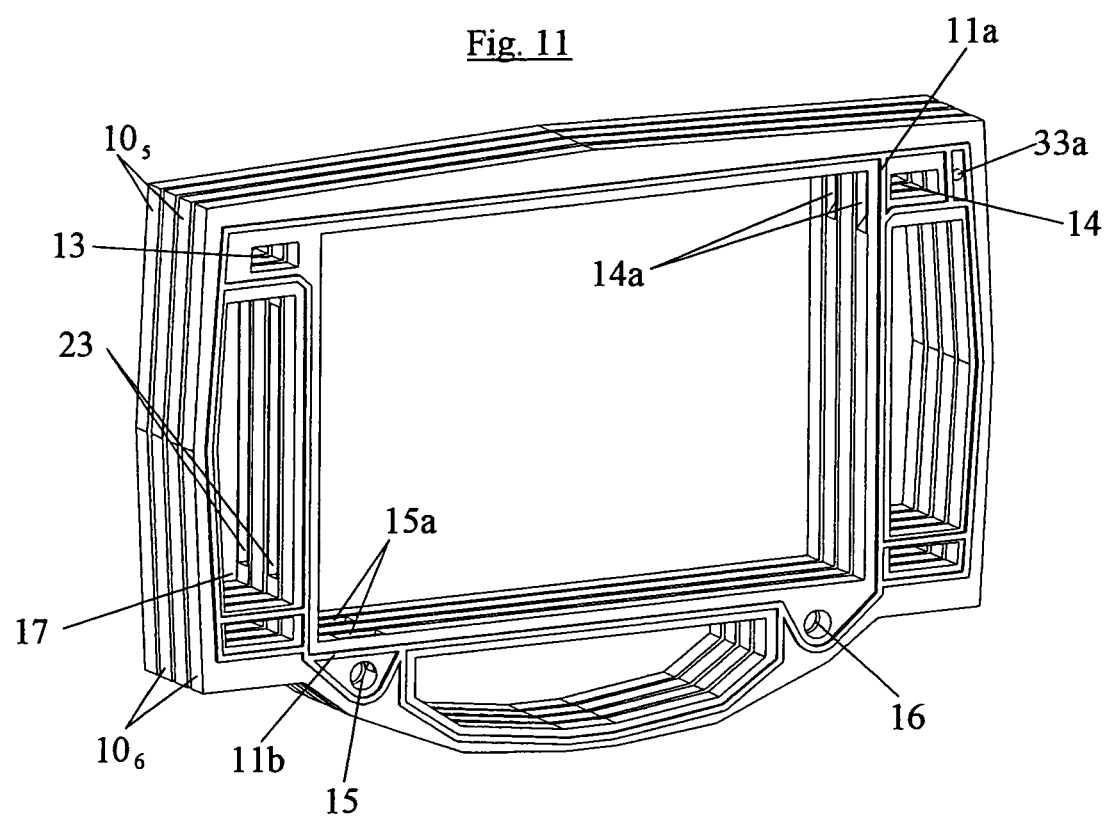
Figure 12:
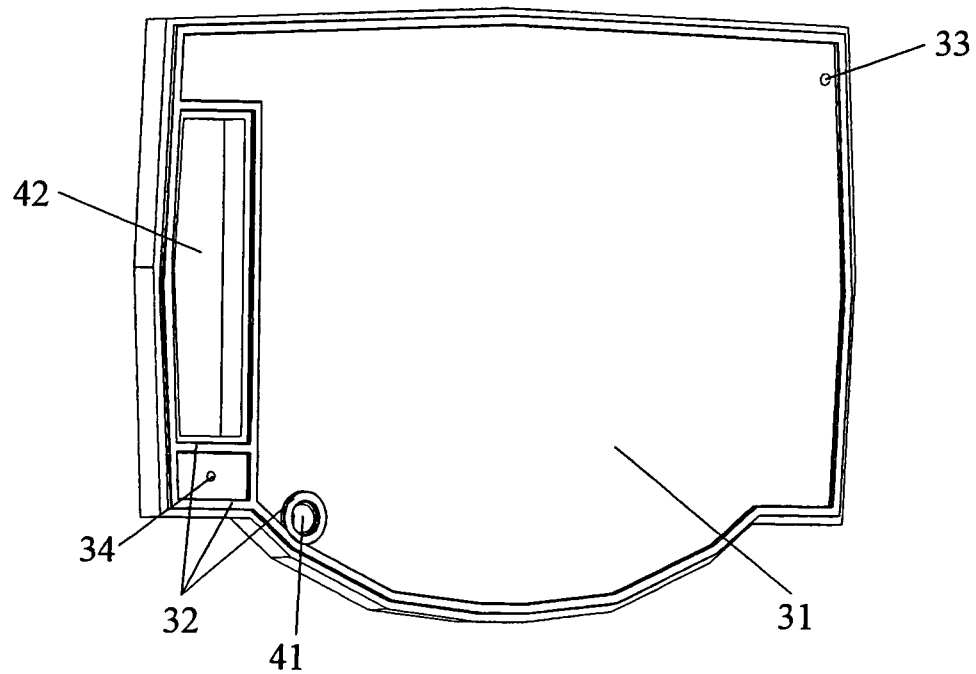

The invention will be explained in more detail in the following with reference to embodiments and to the drawing; there are shown in this:

FIG. 1 a schematic representation of an exemplary frame element of a first kind, with the films being omitted for clarity;

FIG. 2 a schematic representation of an exemplary frame element of a second kind, with the membranes being omitted for clarity;

FIG. 3 a schematic representation of an exemplary frame element of a third kind, with the membranes being omitted for clarity;

FIG. 4 a schematic representation of an exemplary frame element of a fourth kind;

FIG. 5 a schematic representation of an exemplary frame element of a fifth kind;

FIG. 6 a schematic representation of an exemplary frame element of a fifth kind;

FIG. 7 a schematic representation of an exemplary stack including a plurality of frame elements for forming a membrane distillation stage, in particular a multi-effect membrane distillation stage;

FIG. 7a a schematic representation of a series connection of, for example, two respective membrane distillation stages provided with cover plates in accordance with FIG. 7;

FIG. 8 a schematic representation of an exemplary stack including a plurality of frame elements for forming a vapor generator;

FIG. 9 a schematic representation of an exemplary stack including a plurality of frame elements for forming a condenser;

FIG. 10 a schematic representation of an exemplary stack including a plurality of frame elements for forming a heat exchanger;

FIG. 11 a schematic representation of an exemplary stack including a plurality of frame elements for forming a pervaporation module;

FIG. 12 a schematic representation of an exemplary cover plate; and

Figure 13:
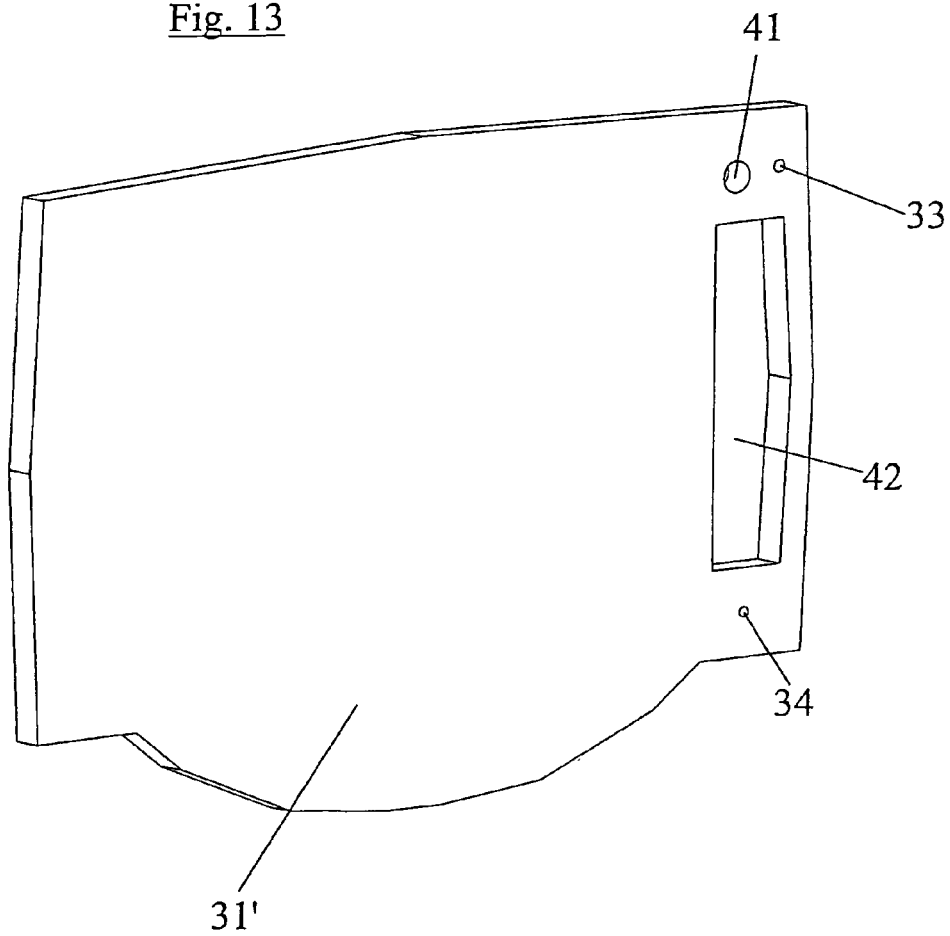

FIG. 13 a schematic representation of a further exemplary cover plate.

A modular flow system includes a plurality of frame elements which can be combined together to form different functional units. In this respect, it can, for example, include one or more of the frame elements $10_1$ to $10_6$ described in more detail in the following with reference to FIGS. 1 to 6 which can be combined together via welding web structures 11 to form different stacks including at least two respective frame elements, in particular at least ten respective frame elements, (cf. FIGS. 7 to 11), in particular for forming a multi-effect membrane distillation stage 35 (cf. FIG. 7), a vapor generator 36 (cf. FIG. 8), a condenser 37 cf. FIG. 9), a heat exchanger 3 (cf. FIG. 10), a filter, a pervaporation stage or pervaporation module (cf. FIG. 11) and/or the like.

The frame elements $10_1$ to $10_6$ each include an outer frame 39 provided with passage openings 13 to 16, with vapor and/or fluid passages 17, 18 and with underpressure passage opening 33a and a central inner region 40 surrounded by the outer frame 39. In addition, the frame elements $10_1$ to $10_6$ are each provided at both sides with a welding web structure 11 which, on the one hand, defines a region including the passage openings 13 to 16, the underpressure passage opening 33a as well as the central inner region 40 and, on the other hand, defines at least two respective regions including a vapor and/or fluid passage 17, 18.

As can be recognized with reference to FIGS. 1 to 6, the central inner region 40 of a respective frame element $10_1$ to $10_6$ is expediently provided with a spacer, in particular a grid-like spacer 12.

Optionally a respective film 27 or membrane 27 can be arranged at the two sides of the spacer, in particular the grid-like spacer 12, in particular welded onto the outer frame 39. In this respect, a respective film 27 or membrane 26 preferably covers the total spacer, in particular the total grid-like spacer 12, with the passage openings 13 to 16 being kept free, however.

A respective at least one vapor and/or fluid passage 17, 18 can be provided at mutually oppositely disposed sides, in FIGS. 1 to 6, on the left and right sides, of a respective frame element $10_1$ to $10_6$.

In this respect, the modular flow system is expediently designed so that the vapor and/or fluid passages 17, 18 provided at a respective side of the frame elements combined together to form a respective stack are aligned with one another. The same expediently also applies to the passage openings 13 to 16 and to the underpressure passage opening 33a.

The modular flow system can, for example, include at least one frame element $10_1$ of a first kind which is shown in FIG. 1 and which includes on a first side, here a left side, for example, and on a second side, here a right side, for example, disposed opposite to it, a respective one vapor and/or fluid passage 17 and 18 respectively, a vapor and fluid passage opening 22 connecting the vapor and/or fluid passage 18 on the second side to the central inner region 40 and in particular on the lower side a condensate passage opening 24 via which the central inner region 40 is connected to a condensate collection passage 19 bounded by the welding web structure 11 and in which a respective film 27 (not shown) is arranged within the welding web structure 11 at both sides of the spacer, n particular the grid-like spacer 12, in particular for forming a condensation space 28 so that the passage openings 13 to 16 remain free. The outer frame 39 preferably includes an underpressure passage opening 33a and, on mutually opposite sides (here again the left and the right sides), a respective inert gas passage 20 and 21 respectively defined by the welding web structure 11. These inert gas passages 20, 21 are each connected via an inert gas passage opening 25 to the central inner region 40 or condensation space 28. For example in the case of a multi-effect membrane distillation stage (cf. FIG. 7), the inert gases can thus be dragged through all frames or stages.

The modular flow system can in particular also include at least one frame element $10_2$ of the second kind shown in FIG.

2 which includes on the first or left side and on the second or right side disposed opposite it a respective vapor and/or fluid passage 17 and 18 respectively and a vapor and/or fluid passage opening 23 connecting the vapor and/or fluid passage 17 on the first side to the central inner region 40, and in which a respective water-tight, vapor-permeable membrane 26 (not shown) is arranged within the welding web structure at both sides of the spacer, in particular the grid-like spacer 12, in particular for forming a vapor or fluid space 29 so that the passage openings 13 to 16 remain free. In this respect, the outer frame 39 preferably includes on mutually oppositely disposed sides, here the first or left side and the second or right side, a respective inert gas passage 20, 21 defined by the welding web structure 11 and an underpressure passage opening 33a, with these inert gas passages 20, 21 and the underpressure passage opening 33a each being separated from the central inner region 40.

The modular flow system can in particular also include at least one frame element $10_3$ of the third kind which is shown in FIG. 3 and which includes on the first or left side and on the second or right side disposed opposite it a respective vapor and/or fluid passage 17 and 18 respectively, a vapor and/or fluid passage opening 23 connecting the vapor and/or fluid passages 17 on the first side the central inner region 40 and a vapor and/or fluid passage opening 22 connecting the vapor and/or fluid passage 18 on the second side to the central inner region 40 and in which a respective membrane 26 or film 27 (not shown) is arranged within the welding web structure 11 at both sides of the spacer, in particular the grid-like spacer 12 in particular for forming a vapor or fluid space 29 so that the passage openings 13 to 16 remain free. In this respect, the outer frame 39 preferably includes on mutually oppositely disposed sides, here the left side and the right side, a respective inert gas passage 20, 21 defined by the welding web structure 11 and an underpressure passage opening 33a, with these inert gas passages 20, 21 and the underpressure passage opening 33a each being separated from the central inner region 40 in the present case.

The modular flow system can, for example, also include at least one frame element $10_4$ of the fourth kind shown in FIG. 4 which includes on the first or left side and on the oppositely disposed second or right side a respective vapor and/or fluid passage 17 and 18 respectively, with the spacer, in particular the grid-like spacer 12 in the present case not being provided either with a film or with a membrane. The outer frame 39 preferably includes on mutually opposite sides, here the left and right sides, a respective further passage defined by the welding web structure 11, e.g. an inert gas passage 20, 21, and an underpressure passage opening 33a. These further passages and/or inert gas passages 20, 21 and the underpressure passage opening 33a are each separated from the central inner region 40 in the present case. In the present case, it is therefore a frame element $10_4$ of the fourth kind without passage openings 22, 23 and 24.

The modular flow system can advantageously also include at least one frame element $10_5$ of the fifth kind shown in FIG. 5 which includes on a first side and on a second side opposite it a respective vapor and/or fluid passage 17 and 18 respectively and a vapor and/or fluid passage opening 23 connecting the vapor and/or fluid passage 17 on the first side to the central inner region 40 and in which a respective, in particular water-tight, vapor-permeable membrane 26 is arranged within the welding web structure 11 at both sides of the spacer, in particular the grid-like spacer 12 in particular for forming a vapor or fluid space 29 such that the passage openings 13 to 16 remain free. The outer frame 39 preferably includes on mutually oppositely disposed sides a respective inert gas passage 20 defined by the welding web structure 11 and an underpressure passage opening 33a, with these inert gas passages 20, 21 and the underpressure passage opening 33a each being separated from the central inner region 40.

The passage openings 13 to 16 include at least two first passage openings 14, 15 and at least two further passage openings 13, 16. In this respect, the welding web structure 11 is provided with additional welding web part pieces 11a, 11b to define the first passage openings 14, 15 with respect to the further passage openings 13, 16.

This frame element $10_5$ of the fifth kind, which can in particular be used in a pervaporation module or pervaporation stage, has a similar structure to the frame element $10_2$ of the second kind, with the additional welding web part pieces 11a and 11b being inserted, however, so that the first passage openings 14, 15 are separated from the further passage openings 13, 16. Two separate fluid circuits can thereby be realized. One fluid circuit can thus be operated via the further passage openings 13, 16 and one fluid passage via the first passage openings 14, 15.

The modular flow system can advantageously also include, for example, at least one frame element $10_6$ of the sixth kind shown in FIG. 6 which includes on a first side and on a second side opposite it a respective vapor and/or fluid passage 17 and 18 respectively, with a respective film 27 being arranged within the welding web structure 11 at both sides of the spacer, in particular the grid-like spacer 12 so that the passage openings 13 to 16 remain free. The outer frame 39 can include on mutually opposite sides a respective further passage, in particular an inert gas passage 20, 21, defined by the welding web structure 11 and an underpressure passage opening 33a, with these further passages and/or inert gas passages 20, 21 and the underpressure passage opening 33a each being separated from the central inner region 40.

The passage openings 13 to 16 include at least two first passage openings 14, 15 and at least two further passage openings 13, 16. The welding web structure 11 is provided with additional welding web part pieces 11a, 11b to define the first passage openings 11, 16 with respect to the further passage openings 13, 16. In addition, the outer frame 39 is provided with passage opening breakthroughs 14a, 15a via which the vapor or fluid space 29 bounded by the films 27 is connected to the first passage openings 14, 15.

This frame element $10_6$ of the sixth kind can likewise be used, for example, for a pervaporation module or pervaporation stage. It has a similar structure to the frame element $10_4$ of the fourth kind, with it being provided at both sides with film, however, and with additionally the welding web part pieces 11a and 11b and the passage opening breakthroughs 14a and 15a being provided.

The membranes 26 or films 27 can each in particular be welded onto the outer frame 39.

In particular also the frame elements not provided with a condensate passage opening can each be provided with a condensate collection passage 19 bounded by the welding structure 11.

As already mentioned, the vapor and/or fluid passages 17, 18 of the frame elements combined together in a respective stack are expediently aligned with one another. The same expediently also applies to the passage openings 13 to 16, to the inert gas passages of further passages 20, 21, to the underpressure passage opening 33a and the condensate collection passages 19.

As can in particular be seen from FIGS. 1 to 6, the passage openings 13, 14 and the underpressure passage opening 33a can, for example, be provided above the vapor and/or fluid passages 17, 18 and the inert gas passages or further passages 20, 21 can each be provided, for example, below the vapor and/or fluid passages 17, 18. The passage openings 15, 16 can, for example, be provided at both sides of the condensation collection passage 19 beneath the spacers, in particular the grid-like spacers 12.

FIG. 7 shows in a schematic representation a stack including four frame elements, for example, for forming a membrane distillation stage 35 in which frame elements $10_1$, $10_2$ of the first and second kind are alternately contained. It can in this respect in particular be a multi-effect stage. The spacers, in particular the grid-like spacers 12, the membranes 26 and the films 27 are omitted for the better recognizability of the different vapor and condensate passage openings. The vapor passage openings 22, condensate passage openings 24 and inert gas passage openings 25 associated with the two frame parts $10_1$ of the first kind and the vapor passage openings 23 associated with the two frame parts $10_2$ of the second kind can be seen. A, for example, gird-like spacer can be inserted between the film 27 and the membrane 26 which defines the spacing between the film 27 and the membrane 26.

FIG. 7a shows in a schematic representation a series connection of, for example, two respective membrane distillation stages 35 in accordance with FIG. 7 which are provided in each case with cover plates 31 and 31' (cf. FIGS. 12 and 13) and in which the respective condensate outflows are mutually connected via U pipes 44. More than two stages can generally, however, also be connected in series.

In accordance with FIG. 7a, the condensate collection passages 19 of the respective stages 35 can thus be mutually connected via the U pipes 44. This embodiment is necessary for the collection of the distillate since the condensate collection passages 19 of the respective stages are at different pressure levels in operation. On a direct connection of the condensate collection passages 19 to one another, this connection would be pressed free by the pressure of the stage 35 having the highest pressure level and there would be a pressure short-circuit of the different stages 35. The different pressure levels between a respective two condensate collection passages 19 are mutually decoupled in the U pipe 44 via the head differences of the condensate in the two limbs of the connecting U pipe 44.

FIG. 8 shows in a schematic representation a stack including four frame elements, for example, for forming a vapor generator 36 in which frame elements $10_2$, $10_4$ of the second and fourth kind are alternately contained. The spacers, in particular the grid-like spacers 12 and the membranes 26 are omitted for a better overview with respect to the different vapor passage openings. The vapor passage openings 23 associated with the frame elements $10_2$ can be recognized. The film can be omitted in such a vapor generator. The membranes can be separated via the frame elements of the fourth kind.

FIG. 9 shows in a schematic representation a stack including four frame elements, for example, for forming a condenser 37 in which frame elements $10_1$, $10_4$ of the first and fourth kind are alternately contained. The spacers, in particular the grid-like spacers 12 and the films 27 are omitted for a better overview with respect to the different vapor and condensate passage openings. In particular the vapor passage openings 22, condensate passage openings 24 and inert gas passage openings 25 associated with the two frame elements $10_1$ of the first kind can be recognized. The membrane can be omitted in such a condenser. The films can be separated via the frame elements of the fourth kind.

FIG. 10 shows in a schematic representation a stack including four frame elements, for example, for forming a heat exchanger 38 in which frame elements $10_3$, $10_4$ of the third and fourth kind are alternately contained. The spacers, in particular the grid-like spacers 12, and the films 27 are omitted for a better overview with respect to the different vapor and condensate passage openings. In particular the fluid passage openings 22 and fluid passage openings 23 associated with the frame elements $10_3$ of the third kind can be recognized. The membrane can be omitted in such a heat exchanger. The films can be separated via the frame elements of the fourth kind.

FIG. 11 shows in a schematic representation an exemplary stack including a plurality of frame elements, here e.g. four again, for forming a pervaporation stage or pervaporation module. This pervaporation module includes alternately arranged frames $10_5$ of the fifth kind and $10_6$ of the sixth kind. If a membrane such as in a membrane distillation stage is used instead of a pervaporation membrane for a respective frame $10_5$ of the fifth kind, a vapor generator with an integrated heating circuit is obtained.

In accordance with FIG. 11, for example, pervaporation modules (pervaporation stages) or vapor generators with an integrated heating circuit can thus be prepared in that a frame element $10_5$ of the fifth kind provided with a corresponding membrane is welded in accordance with FIG. 5 to a frame element $10_6$ of the sixth kind provided with a film at both sides in accordance with FIG. 4 to form a stack and the ends are welded to cover plates 31, 31', for example, in accordance with FIGS. 12 and 13. A space connected to the passage openings 13 and 16 which is bounded by a film 27 on the one side and by a membrane 28 on the other side results between two respective frame elements due to the residual height of the welding web structure 11 removed in the welding, including the welding web part pieces 11a, 11b. In this respect, a spacer, for example a mesh-like spacer, is expediently placed between the film 27 and the membrane 26 which defines the spacing between the film 27 and the membrane 26. Such a spacer can advantageously also be provided in this space in all other stages and modules.

The passage opening breakthroughs 14a and 15a connect the vapor or fluid space 29 of the frame elements $10_6$ of the sixth kind bounded by the films 27 to the passage openings 14 and 15. The vapor or fluid space 29 of the frame elements $10_5$ of the fifth kind bounded by the membranes 26 is connected to the vapor and/or fluid passage 17 via the vapor and/or fluid passage opening 23.

The operation of such a stack configured as a pervaporation module (pervaporation stage) or as a vapor generator with an integrated heating circuit results from the following:

The fluid spaces 29 of the frames $10_6$ of the sixth kind are charged with a heating fluid via the passage openings 14 and 15.

A liquid to be concentrated flows through the liquid spaces 30, supplied through the passage openings 13 and 16. Said liquid is heated by the heating fluid in the fluid spaces 29 of the frame elements $10_6$ of the sixth kind and vapor passes through the membrane 26 into the vapor spaces 29 of the frame elements $10_5$ of the fifth kind and from there onward through the vapor passage openings 23 into the passage 17 from where it is passed on.

If in this configuration a membrane 26 is used similar to that in the membrane distillation stage, this stack works as a vapor generator with an integrated heating circle.

If a pervaporation membrane is used which has a selective permeability with respect to the individual components of the mixture, azeotropic points of mixtures can be overcome since a selection going beyond the possibilities of distillation takes place by the pervaporation membrane.

A respective stack including a plurality of frame elements combined together by welding can be connected, in particular welded, at its two ends in each case to a cover plate 31, 31' having connection openings 41, 42 (cf. in particular also FIGS. 12 and 13).

FIG. 12 shows in a schematic representation an exemplary cover plate 31 having exemplary connection openings 41, 42 which can, for example, be associated with a passage opening 15 or with a vapor and/or fluid passage 17. This cover plate 31 is provided with an underpressure connection 33. The cover plate 31 is moreover provided with an underpressure seal 32 surrounding the connection openings 41, 42 and arranged along the cover margin.

If the frame elements include the already mentioned underpressure passage openings 33a separated by the welding web structure 11, this underpressure opening 33a can be aligned with the underpressure connection 33 in the cover plates. By integrating the previously outwardly disposed underpressure connection from stack to stack into the interior of the stack, the otherwise externally required underpressure connection lines for supplying the pressure plates with underpressure are dispensed with.

FIG. 13 shows the further cover plate 31' having the exemplary connection openings 41, 42 by way of example.

Mutually following stacks can be connected together with a minimal effort using the mutually oppositely disposed cover plates 31, 31' associated with mutually following stacks. Whereas in the present case, only one of the two cover plates, namely the cover plate 31, is provided with an underpressure seal 32, a seal can generally also respectively be associated with each cover plate. The two cover plates 31, 31' are pressed lightly toward one another. Underpressure can be applied to the cover plate 31 in accordance with FIG. 12 via the underpressure connection 33, whereby the two cover plates 31, 31' are pressed toward one another. This underpressure is communicated via the underpressure passage openings 33a of the frame elements to the following cover plate and can thus press the next stack with the aid of the underpressure via the underpressure connector 33. The corresponding connections of the two stacks are sealingly connected to one another by the seal 32 running around the passage openings 41, 42. Different functional units such as a vapor generator—a membrane distillation stage—a membrane distillation stage—a membrane distillation stage—a condenser of a multi-effect plant can be connected together with a minimal effort via different embodiments of the passage openings.

In accordance with FIG. 7, for example, multi-effect stages, i.e. individual stages of a multi-effect membrane distillation plant, can thus be prepared in that a frame element $10_1$ of the first kind provided with film at both sides in accordance with FIG. 1 is welded to a frame element of the second kind provided with a membrane at both sides in accordance with FIG. 2 to form a stack and the ends are welded to cover plates 31, 31' in accordance with FIGS. 12. and 13. A space which is connected to the passage openings 13 to 16 and which is bounded by a film 27 at the one side and by a membrane 26 at the other side is produced between two respective frame elements through the residual height of the welding web structure 11 removed on welding.

The operation of a stack configured as a multi-effect stage results as follows under the operating conditions of a multi-effect plant such as is described in WO 2007/054311:

The vapor is introduced into the vapor passage 18 and moves through the vapor passage openings 22 into the condensation spaces 28. The liquid to be concentrated flows through the liquid space, supplied by the passage openings 13 to 16, whereby the vapor introduced through the vapor passage 18 condenses at the films 27. The condensate runs via the condensate passage openings 24 into the condensate collection passage 19. The enthalpy of condensation transferred to the liquid to be concentrated causes it to boil and the vapor created flows through the membrane 26 into the vapor spaces 29 and from there onward through the vapor passage openings 23 into the passage 17, from where it is then forwarded into the next stage. Inert gas dragged in by the concentrated liquid is disposed of via the inert gas passages 20, 21 and the inert gas passage openings 25.

In addition, in accordance with FIG. 8, vapor generators can e.g. be formed in that frame elements $10_2$ of the second kind provided at both sides with membranes in accordance with FIG. 2 and frame elements $10_4$ of the fourth kind in accordance with FIG. 4 are welded alternately to form a stack and the ends are welded to cover plates in accordance with FIGS. 12 and 11. The frame elements $10_4$ of the fourth kind in accordance with FIG. 4 expand the liquid space 30 bounded in this case by two membranes 26 in accordance with FIG. 7 by a frame thickness so that a substantially higher volume flow of the liquid to be concentrated can flow through this liquid space. This is necessary since the enthalpy of evaporation has to be provided by sensitive heat.

The operation of such a vapor generator results from the following:

The heated liquid flows through the liquid space, supplied by the passage openings 13 to 16, and boils due to pressure. The arising vapor flows through the membrane 26 into the vapor spaces 29 and from there onward through the vapor passage openings 22 into the passage 17, from where it is then forwarded.

In addition, in accordance with FIG. 9, condensers can e.g. be formed in that frame elements $10_1$ of the first kind provided at both sides with film in accordance with FIG. 1 and frame elements $10_4$ of the fourth kind in accordance with FIG. 4 are welded alternately to form a stack and the ends are welded to cover plates 31, 31' in accordance with FIGS. 12 and 11. The frame elements $10_4$ of the fourth kind in accordance with FIG. 4 expand the liquid space 30 bounded in this case by two films 27 in accordance with FIG. 7 by a frame thickness so that a substantially higher volume flow of the cooling liquid can flow through this liquid space. This is of particular advantage since the enthalpy of condensation has to be led off by sensitive heat transfer.

The operation of such a condenser results from the following:

The cooling liquid flows through the liquid space, supplied by the passage openings 13 to 16. The vapor is introduced into the vapor passage 18 and moves through the vapor passage openings 22 into the condensation spaces 28. The vapor condenses at the films 27 and the condensate runs via the condensate passage openings 24 into the condensate collection passage 19. Inert gas dragged in by the vapor is disposed of via the inert gas passages 20, 12 and the inert gas passage openings 25.

In accordance with FIG. 10, heat exchangers can e.g. be formed in that frame elements $10_3$ of the third kind provided at both sides with film in accordance with FIG. 3 and frame elements $10_4$ of the fourth kind in accordance with FIG. 4 are welded alternately to form a stack and the ends are welded to cover plates 12 and 13 in accordance with FIGS. 12 and 13. The frame elements $10_4$ of the fourth kind in accordance with FIG. 4 expand the liquid spaces 30 of FIG. 7 bounded by two films 27 in this case by a frame thickness so that a substantially higher volume flow can flow through these liquid spaces.

The operation of such a heat exchanger results from the following:

A liquid flows through the liquid space, supplied by the passage openings 13 to 16. A second liquid flows via the passages 17 and 18 through the frame elements $10_3$ of the third kind in accordance with FIG. 3. The heat is exchanged between the liquids through the films 27.

In addition, in accordance with FIG. 10, filters can, for example, also be formed in that frame elements $10_3$ of the third kind provided at both sides with filter membranes in accordance with FIG. 3 and frame elements $10_4$ of the fourth kind in accordance with FIG. 4 are welded alternately to form a stack and the ends are welded to cover plates in accordance with FIGS. 12 and 13. The basic construction follows that of the heat exchanger construction, with filter membranes, however, being applied instead of the films. The filter can be easily flushed back by the connections analog to the heat exchanger, with a partial removal from the medium to be filtered also being possible, whereby the filter service life is extended.

In addition, as already stated, pervaporation stages or pervaporation modules can, for example, also be formed (cf. FIG. 11) in that frame elements provided with a pervaporation membrane at both sides are alternately welded to frame elements provided with films to form a stack and the ends are welded to cover plates in accordance with FIGS. 12 and 13. A pervaporation membrane is used, for example, to overcome the azeotropic point on the separation of multi-substance mixtures such as alcohol and water, for example, which cannot be overcome using conventional distillation processes. The pervaporation membrane is only permeable for the gas phase of a substance such as that of water, for example. The mixture flows, heated, through the liquid space which is bounded on one side by a pervaporation membrane and on the other side by a film. A heating medium which heats the mixture via the film flows through the frame elements provided with films. The one gas phase flows through the pervaporation membrane into the vapor space of the frame provided with a membrane due to the vapor pressure and is disposed of from there via the vapor passage opening 23 and the vapor passage 17 so that the mixture is concentrated with respect to the portion not passed through.

The invention claimed is:

1. A modular flow system having a plurality of frame elements (101 to 106) which can be combined together via welding web structures (11) to form different stacks including in each case at least two frame elements for forming different functional elements wherein the frame elements (101 to 106) each include an outer frame (39) provided in each case with passage openings (13 to 16) and with vapor and/or fluid passages (17, 18) and a central inner region (40) surrounded by the outer frame (39) and are provided at first and second oppositely disposed sides with a respective welding web structure (11) which defines a region including the passage openings (13 to 16) and the central inner region (40) and also defines at least two regions each including at least one of a vapor and a fluid passage (17, 18).

2. A modular flow system in accordance with claim 1, wherein at least ten frame elements are provided in each stack.

3. A modular flow system in accordance with claim 1, wherein at least one of a membrane distillation stage (35), a vapor generator (36), a condenser (37), a heat exchanger (38), a filter and a pervaporation stage is provided as a functional element.

4. A modular flow system in accordance with claim 1, wherein
the central inner region (40) of a respective frame element (101 to 106) is provided with a spacer.

5. A modular flow system in accordance with claim 4, wherein said spacer is a spacer in the form of a grid.

6. A modular flow system in accordance with claim 4, wherein
a respective film (27) or membrane (26) is arranged at first and second sides of the spacer (12).

7. A modular flow system in accordance with claim 6, wherein said films or membranes are welded to said spacer.

8. A modular flow system in accordance with claim 6, wherein
a respective film (27) or membrane (26) covers the total spacer (12), but the passage openings (13 to 16) are kept free.

9. A modular flow system in accordance with claim 1, wherein
at least one respective vapor and/or fluid passage (17, 18) is provided on mutually opposite sides of a respective frame element (101 to 106).

10. A modular flow system in accordance with claim 9, wherein
the vapor and/or fluid passages (17, 18) provided on a respective side of the frame elements combined to form a respective stack are aligned with one another.

11. A modular flow system in accordance with claim 1, wherein
it includes at least one frame element (101)) of a first kind which includes on a first side and on a second side disposed opposite it a respective vapor and/or fluid passage (17 or 18 respectively), a vapor and/or fluid passage opening (22) connecting the vapor and/or fluid passage (18) on the second side to the central inner region (40) and a condensate passage opening (24) at the lower side via which the central inner region (40) is connected to a condensate collection passage (19) bounded by the welding web structure (11) and wherein a respective film (27) is arranged within the welding web structure (11) at both sides of the spacer (12) for forming a condensation space (28) such that the passage openings (13 to 16) remain free.

12. A modular flow system in accordance with claim 11, wherein the outer frames (39) on mutually oppositely disposed sides each include an inert gas passage (20, 21) defined by a said welding web structure (11), with at least one inert gas passage (20, 21) being connected to the central inner region (40).

13. A modular flow system in accordance with claim 12, wherein an underpressure passage opening (33*a*) defined by the welding structure (11) is provided.

14. A modular flow system in accordance with claim 1, wherein
it includes at least one frame element (102) of a second kind which includes on a first side and on a second side disposed opposite to it a respective vapor and/or fluid passage (17 and 18 respectively) and a vapor and/or fluid passage opening (23) connecting the vapor and/or fluid passage (17, 18) on the first side to the central inner region (40) and in which a respective water-tight, vapor-permeable membrane (26) is arranged within the welding web structure (11) at first and second sides of the spacer (12).

15. A modular flow system in accordance with claim 14, wherein the membranes (26) at first and second sides of the spacer form a vapor or fluid space (29) so that the passage openings (13 to 16) remain free.

16. A modular flow system in accordance with claim 15, wherein the outer frame (39) includes on mutually opposite sides a respective inert gas passage (20, 21) defined by the welding web structure (11).

17. A modular flow system in accordance with claim 16, wherein an underpressure passage opening (33a) defined by the welding web structure (11) is provided and the inert gas passages (20, 21) are each separated from the central inner region (40).

18. A modular flow system in accordance with claim 1, wherein
   it includes at least one frame element (103) of a third kind which includes on a first side and on a second side disposed opposite to it a respective vapor and/or fluid passage (17 and 18 respectively), a vapor and/or fluid passage opening (23) connecting the vapor and/or fluid passage (17) on the first side to a central inner region (40) and a vapor and/or fluid passage opening (22) connecting the vapor and/or fluid passage (18) on the second side to a central inner region (40) and in which a respective membrane (26) or film (27) is arranged within the welding web structure (11) at both sides of the spacer (40).

19. A modular flow system in accordance with claim 18 wherein a vapor or fluid space (29) is formed so that the passage openings (13 to 16) remain free.

20. A modular flow system in accordance with claim 19, wherein the outer frame (39) includes on mutually opposite sides a respective inert gas passage (20, 21) defined by the welding web structure (11).

21. A modular flow system in accordance with claim 20, wherein an underpressure passage opening (33a) defined by the welding web structure (11) is provided and the inert gas passages (20, 21) are each separated from the central inner region (40).

22. A modular flow system in accordance with claim 1, wherein
   it includes at least one frame element (104) of a fourth kind which includes on a first side and on a second side disposed opposite it a respective vapor and/or fluid passage (17 and 18 respectively), with the spacer (12) not being provided either with a film or with a membrane.

23. A modular flow system in accordance with claim 22, wherein the outer frame (39) includes on mutually oppositely disposed side a respective further passage.

24. A modular flow system in accordance with claim 23, wherein said respective further passage is an inert gas passage (20, 21) defined by the welding web structure (11).

25. A modular flow system in accordance with claim 24, wherein an underpressure passage opening (33a) defined by the welding web structure (11) is provided and the further passages (20, 21) are each separated from the central inner region (40).

26. A modular flow system in accordance with claim 1, wherein it includes at least one frame element (105) of a fifth kind which includes on a first side and on a second side disposed opposite to it a respective vapor and/or fluid passage (17 and 18 respectively) and a vapor and/or fluid passage opening (23) connecting the vapor and/or fluid passage (17) on the first side to the central inner region (40) and in which a respective water-tight, vapor-permeable membrane (26) is arranged within the welding web structure (11) at both sides of the spacer (12).

27. A modular flow system in accordance with claim 26, wherein a vapor or fluid space (29) is formed and the passage openings (13 to 16) remain free.

28. A modular flow system in accordance with claim 27, wherein the outer frame (39) includes an underpressure passage opening (33a) defined by the welding web structure (11) and on mutually opposite sides a respective inert gas passage (20, 21) defined by the welding web structure (11), these inert gas passages (20, 21) respectively being separated from the central inner region (40), and with the passage openings (13 to 16) including at least two first passage openings (14, 15) and at least two further passage openings (13, 16) and the welding web structure (11) being provided with additional welding web part pieces (11a, 11b) to define the first passage openings (14, 15) with respect to the further passage openings (15, 16).

29. A modular flow system in accordance with claim 1, wherein
   it includes at least one frame element (106) of a sixth kind which includes on a first side and on a second side opposite to it a respective vapor and/or fluid passage (17 and 18 respectively), with a respective film (27) being arranged within the welding web structure (11) at both sides of the spacer (12) so that the passage openings (13 to 16) remain free.

30. A modular flow system in accordance with claim 29, wherein the outer frame (39) includes an underpressure passage opening (33a) defined by the welding web structure (11) and on respectively oppositely disposed sides a respective further passage.

31. A modular flow system in accordance with claim 30, wherein an inert gas passage (20, 21) is defined by the welding web structure (11) and these further passages (20, 21) are each separated from the central inner region (40), and with the passage openings (13 to 16) including at least two first passage openings (14, 16) and at least two further passage openings (13, 16), the welding web structure (11) being provided with additional welding web part pieces (11a, 11b) to define the first passage openings (14, 15) with respect to the further passage openings (13, 16) and the outer frame (39) being provided with passage opening breakthroughs (14a, 15a) via which the vapor or fluid space (29) bounded by the film (27) is connected to the first passage openings (14, 15).

32. A modular flow system in accordance with claim 1, wherein
   a stack including a plurality of frame elements (101 to 106) combined together by welding is connected at first and second oppositely disposed ends to respective cover plates (31, 31') having connection openings (41, 42), with at least one of the cover plates (31, 31') being provided with an underpressure connection (33).

33. A modular flow system in accordance with claim 32, wherein at least one of the cover plates (31, 31') is provided with an underpressure seal (32) surrounding the connection openings (41 42) and arranged at the cover margin.

34. A modular flow system in accordance with claim 32, wherein said cover plates are welded to said stack.

35. A modular flow system in accordance with claim 1, wherein at least one stack of the following kind is provided:
   a stack including a plurality of frame elements forming a membrane distillation stage (35) in which frame elements (101, 102) of the first and second kind are alternately contained;
   a stack including a plurality of frame elements forming a vapor generator (36) in which frame elements (102, 104) of the second and fourth kind are alternately contained;
   a stack including a plurality of frame elements forming a condenser (37) in which frame elements (101, 104) of the first and fourth kind are alternately contained;

a stack including a plurality of frame elements forming a heat exchanger (38) in which frame elements (103, 104) of the third and fourth kind are alternately contained;

a stack including a plurality of frame elements forming a filter in which frame elements (103, 104) of the third and fourth kind are alternately provided at both respective sides with filter membranes and a stack including a plurality of frame elements forming a pervaporation stage in which frame elements (105, 106) of the fifth and sixth kind are alternately provided, with pervaporation membranes (26) being provided.

\* \* \* \* \*